(12) United States Patent
Macor

(10) Patent No.: US 6,463,299 B1
(45) Date of Patent: Oct. 8, 2002

(54) METHOD AND APPARATUS PROVIDING AN INTEGRAL COMPUTER AND TELEPHONE SYSTEM

(75) Inventor: James J. Macor, Jackson, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/172,076

(22) Filed: Oct. 14, 1998

(51) Int. Cl.[7] .............................. H04B 1/38; H04M 1/00
(52) U.S. Cl. ................ 455/556; 455/557; 455/420; 379/90.01; 379/93.09; 379/110.01
(58) Field of Search ................ 455/556, 557, 455/66, 414, 420, 461, 74.1, 550, 575, 90; 379/93.09, 110.01, 90.01, 102.01, 102.02, 93.11, 420.02, 420.03, 420.04

(56) References Cited

U.S. PATENT DOCUMENTS

| | | | | |
|---|---|---|---|---|
| 5,371,783 A | * | 12/1994 | Rose et al. | 455/462 |
| 5,727,047 A | * | 3/1998 | Bentley et al. | 379/93.05 |
| 5,787,152 A | * | 7/1998 | Freadman | 379/67 |
| 5,802,466 A | * | 9/1998 | Gallant et al. | 455/413 |
| 5,841,840 A | * | 11/1998 | Smith et al. | 379/93.01 |
| 5,884,191 A | * | 3/1999 | Karpus et al. | 379/93.11 |
| 5,983,073 A | * | 11/1999 | Ditzik | 455/11.1 |
| 5,991,640 A | * | 11/1999 | Lilja et al. | 455/557 |
| 6,169,734 B1 | * | 1/2001 | Wilson | 370/352 |

* cited by examiner

Primary Examiner—Dwayne Bost
Assistant Examiner—Lewis West
(74) Attorney, Agent, or Firm—Birch, Stewart, Kolasch & Birch, LLP

(57) ABSTRACT

A method and apparatus for providing an integral computer and telephone system includes a CPU, a telephone line interface operatively linked to the CPU, and a display device operatively linked to the CPU. Audio input and output devices are operatively linked to the CPU. A communication module for transceiving wireless signals is operatively linked to a remote unit. The system includes a switching device connected to the CPU and the communication module, where the switching device provides selective operation of the CPU and the remote unit, whereby when a user selects remote unit telephony, the remote unit substantially increases privacy and facilitates portability via wireless operation while when the user selects telephony via the CPU, the CPU facilitates both audio and visual information exchange.

21 Claims, 4 Drawing Sheets

METHOD AND APPARATUS PROVIDING AN INTEGRAL COMPUTER AND TELEPHONE SYSTEM

BACKGROUND OF THE INVENTION

1. Field of the Invention

The present invention relates to computers and communications; more specifically, a method and apparatus which integrates a computer and a telephone system.

2. Description of the Related Art

In the past, telephone calls could be received from a computer having speakers and a microphone therein. However, there are inherent limitations with the size of a personal computer for efficient operation by a user and a personal computer's operating environment which requires a microphone and a speaker to make phone calls. Receiving and generating phone calls from a personal computer does not provide for privacy features which are available with a hand-held telephone.

SUMMARY OF THE INVENTION

An embodiment of the present invention provides an apparatus and method for integrating a personal computer and a telephone system. The present invention permits shifting between computer telephony and remote unit telephony upon actuation of a switch. To facilitate use, the remote unit has a wireless link to the personal computer.

Yet another embodiment of the present invention comprises a method executable on a computer system which integrates a computer and telephone system by detecting whether a CPU of a personal computer is in an active or an inactive mode and then detecting a signal from switches disposed on the personal computer and remote unit.

DETAILED DESCRIPTION OF THE INVENTION

Figure 1:
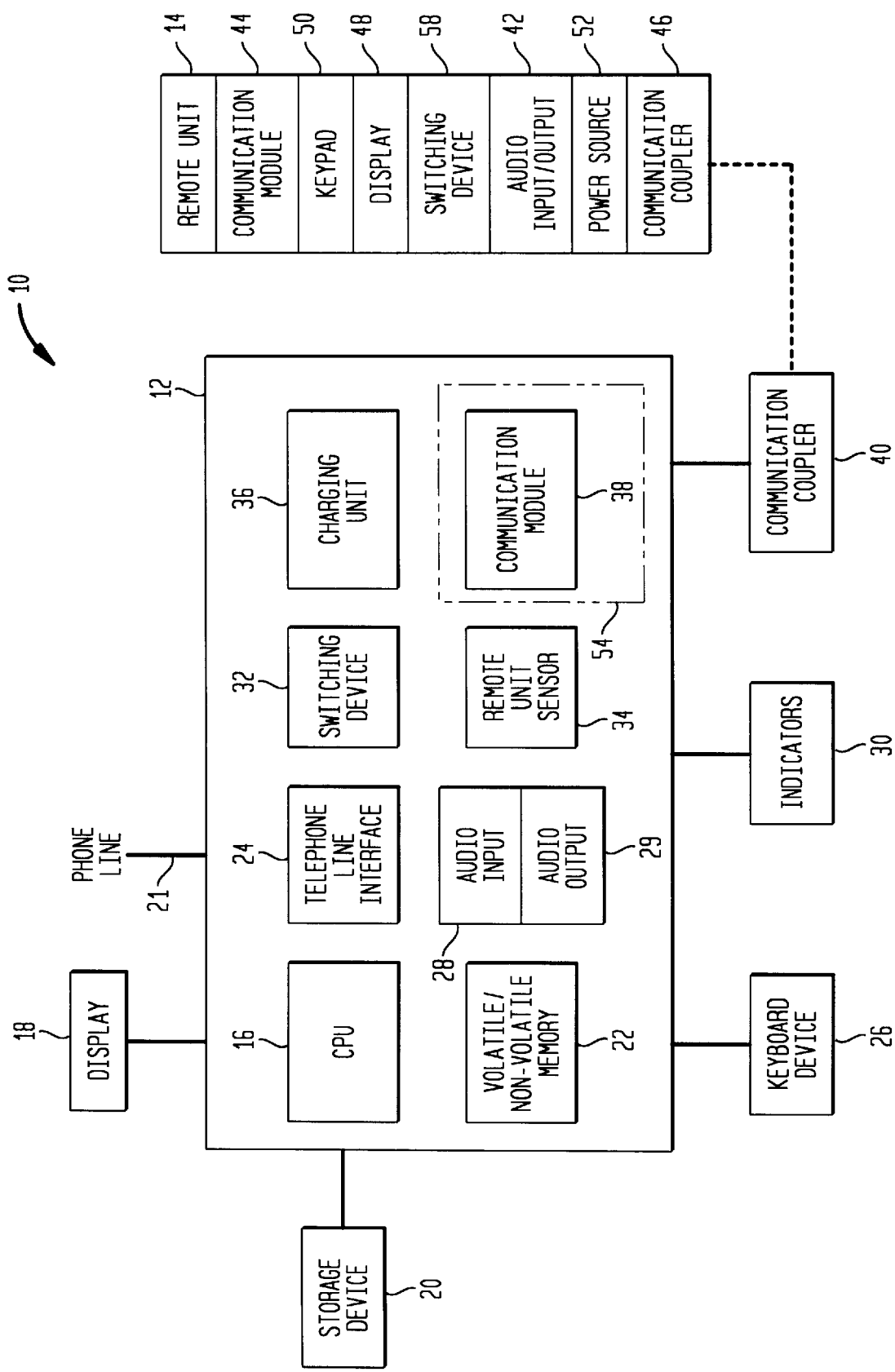
FIG. 1 illustrates a block diagram of an integral computer and telephone system.

FIG. 1 illustrates an integral computer and telephone system which includes a base unit 12 and a remote unit 14. The base unit 12 preferably includes a central processing unit (CPU) 16 which is operatively linked to a display device 18, a storage device 20, and at least one of a volatile and non-volatile memory 22. The display device 18 is preferably a cathode-ray tube (CRT) while the storage device 20 is preferably a disk drive or other storage device such as a CD-ROM or a tape drive. The volatile or non-volatile memory 22 is preferably either a random access memory (RAM) or a read only memory (ROM).

The CPU 16 is further operatively linked to a telephone line interface 24, a keyboard device 26, an audio input device 28, and an audio output device 29. The telephone line interface 24 is connected to a telephone line 21. The telephone line interface 24 is preferably a modem which can be an internal or external type relative to the CPU 16. The audio input and output devices 28, 29 are preferably a microphone and a speaker. The CPU 16 is further linked to indicators 30, a switching device 32, a remote unit sensor 34, and a charging unit 36. The indicators 30 can take the form of either light emitting diodes (LEDs) or liquid crystal displays (LCDs). The remote unit sensor 34 can be a device which monitors the contacts of the charging 36 or it can be a separate device such as a mechanical switch or inductive or capacitive coupling type link that determines the presence of the remote unit 14. The CPU 16 is also linked to a communications module 38.

The communication module 38 is operatively linked to a communication coupler 40. The communication module 38 is preferably a radio frequency (RF) generator. The communication module 38 and charging unit 36 are designed to interface with the remote unit 14. The remote unit 14 is preferably a radio frequency (RF) handset. More preferably, the remote unit 14 is a wireless pocket phone having a communication coupler 46 that is preferably an RF antenna.

The communication module 38 is preferably the Lucent Technologies' TRANSTALK™ radio module (a digital wireless telephone system which employs RF links) while the communication coupler 40 of the base unit 12 is preferably an antenna. However, the base unit 12 and remote unit 14 can be operatively linked by other communication mediums. Other communication mediums include, but are not limited to, inductive coupling, capacitive coupling, magnetic coupling, infrared coupling and other type of wireless transmission mediums.

Surrounding the communication module 38 is electromagnetic interference (EMI) or RF shielding 54. Such shielding 54 is required to prevent any undesirable interference with operation of the central processing unit 16 and display device 18.

The remote unit 14 includes its own audio input/output devices 42 and a communication module 44. The remote unit 14 further includes a display/indicator 48 in addition to a switch device 58. The remote unit 14 has a keypad 50 and a rechargeable power source 52 which is preferably a rechargeable battery. The remote unit is preferably the Lucent Technologies TRANSTALK™ pocket phone (a digital wireless transceiver which employs RF links).

Figure 2:
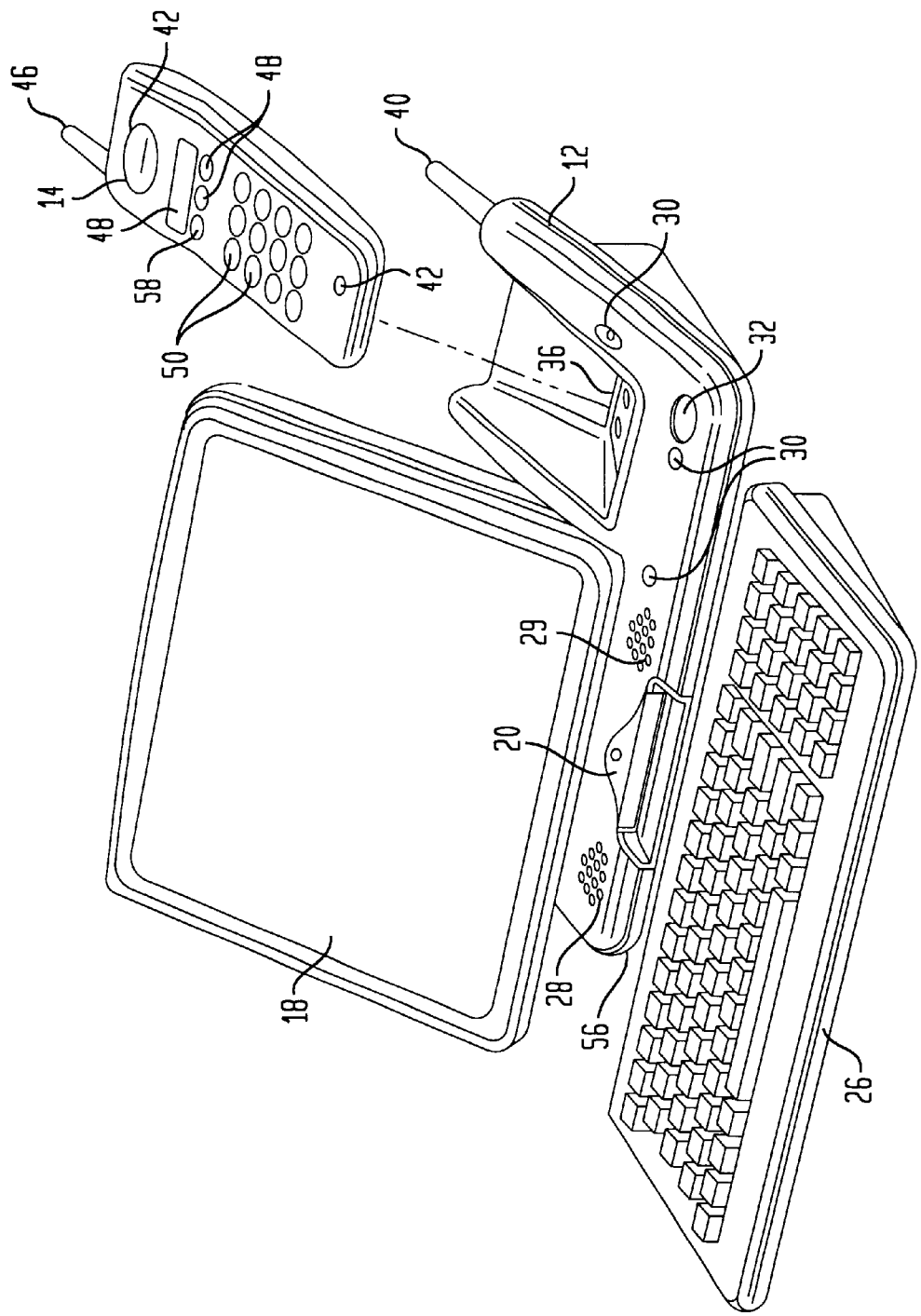
FIG. 2 illustrates a perspective view of an integral computer and telephone system.

FIG. 2 illustrates a preferred embodiment of the invention where the base unit 12 has an integral housing 56 which includes the CPU 16 (not shown), the storage device 20, the display 18, the audio input/output devices 28/29, indicators 30, the charging unit 36, the switching device 32, the communication module 38 (not shown), and the remote unit sensor 34 (not shown). The communication coupler 40 is attached to a side of the housing 56. The switching device 32 is preferably a mechanically actuated switch such as a flat key.

FIG. 2 also illustrates the preferred embodiment of the remote unit 14 which includes the audio input/output devices 42, the communication module 44 (not shown), keypad 50, display/indicators 48, the switching device 58, the communication coupler 46, and a power source (not shown). Similar to the switching device 32 of the base unit 12, the switching device 58 of the remote unit is preferably a mechanically actuated switch.

During operation of the integral personal computer and telephone system, the switching devices 32 and 58 permit shifts in the modes of operation of the system. When switching device 58 is activated, a telephone call is transferred to the base unit 12 which includes the central processing unit 16. When a telephone call is desired to be received by or forwarded to the remote unit 14, the switching device 32 on the base unit 14 is activated. The operation of remote unit 14 is desirable when a user requires privacy which is possible by the portable ergonomic design of the remote unit 14 and the wireless link between the base unit 12 and the remote unit 14. The operation of the base unit 12 which includes CPU 16 is desirable when a user wants to exchange both audio and visual information from the CPU 16.

Indicators 30 on the base unit 12 inform a user of the status of the switching device 32, the status of the charging unit 36, the status of voice mail messages, and the status of E-mail messages. The indicators 48 on the remote unit 14 indicate the status of the power source 52, the status of switching device 58, the status of voice mail messages, and the status of E-mail messages. In the embodiment illustrated in FIG. 2, the keyboard device 26 is physically separate from the base unit 12. However, in other embodiments, the keyboard device 26 is integral with the base unit 12.

Figure 3:
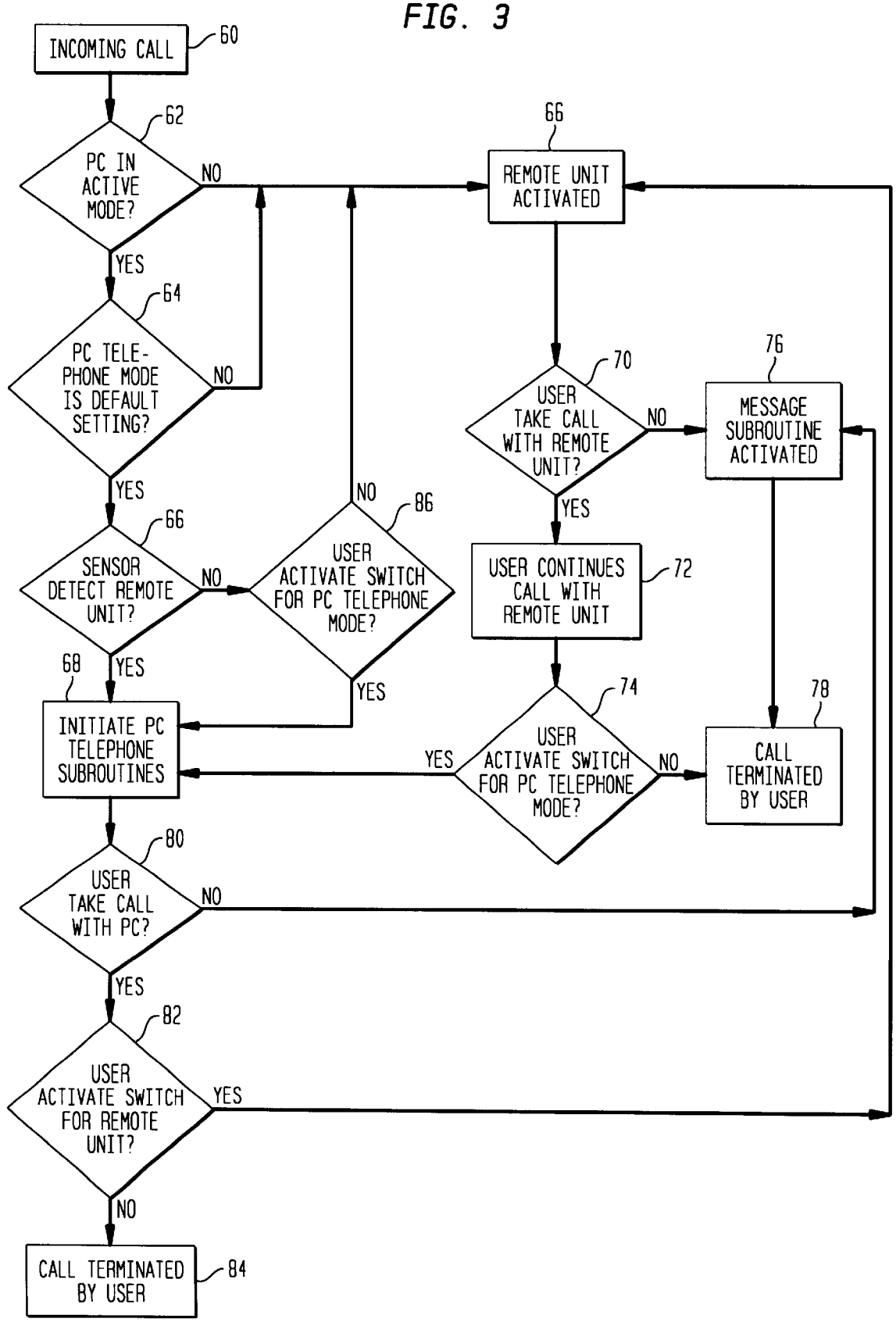
FIG. 3 illustrates a functional block diagram of processing incoming phone calls with the integral computer and telephone system.

FIG. 3 illustrates a flowchart of how the integral computer and telephone system handles incoming phone calls.

The flowchart outlined by FIG. 3 provides a method which can be executable in a computer system in the form of program code sections. The program outlined by the flowcharts of FIG. 3 can be programmed in the following programming languages which include, but are not limited to, C/C++, Delphi, JAVA (object oriented programming language), JavaScript, PASCAL, PERL, Visual Basic, Ada, and Eiffel.

Block 60 represents the process of receiving an incoming call with the integral computer and telephone system 10 via the phone line 21. Block 62 represents a step in which it is determined whether the CPU 16 is an operative or an inoperative state. CPU 16 is typically in an inoperative state when a user does not need to interface with the CPU 16 via the keyboard device 26 or display 18.

When the computer or CPU 16 is not in use it is referred to as being in a "sleep mode" or an inoperative state. If the CPU 16 is in an operative state, the status of a default setting is then determined in the decisional step 64. If CPU 16 is in an inoperative state, then the remote unit 14 is activated as shown in function block 66. The activation of remote unit 14 means that a call is forwarded to the remote unit 14 where the remote unit 14 is designed to produce an audio output signal such as a ringing sound generated by an audio output device 42 such as a speaker In predicate node 64, CPU 16 determines if a default software setting is for a computer based communication. If the user has programmed or selected CPU to be the default communication device, CPU 16 then proceeds to predicate node 66.

In predicate node 66, the CPU 16 determines whether or not the remote unit 14 is adjacent to the base unit 12 with remote unit sensor 34. If the remote unit 14 is disposed adjacent to the base unit 12, then the process proceeds to functional block 68 where telephone subroutines are executed by the CPU 16.

If the remote unit 14 is not adjacent to the base unit 12, the CPU 16 in step 86 then determines whether the switching device 58 on the remote unit 14 or switching device 32 on the base unit 12 has been activated. If the switching device 58 on the remote unit 14 has been activated to forward the call back to the base unit 12, then the process proceeds to functional block 68. Otherwise, if the remote unit is not adjacent to the base unit 14 and the switching device 58 on the remote unit 14 has not been activated, then the call is forwarded to the remote unit 14 where the remote unit 14 is activated as shown in functional block 66.

After the remote unit 14 is activated in functional block 66, the CPU 16 then determines whether or not the user takes the call with the remote unit 14 as shown in predicate node 70. If the user does take the call with the remote unit 14, the process continues to functional block 72 where the user takes the call via the audio input/output devices 42 of the remote unit 14. While the user takes the call, the CPU 16 continuously monitors the status of the switching devices 58 and 32 to determine if the user would like to take the call with the base unit 12 as shown in predicate node 74. If the user activates either switching device 58 or 32, the call is forwarded to the base unit 12 where the CPU 16 initiates telephone subroutines as outlined by functional block 68.

If the user does not take the call with the remote unit as outlined in predicate node 70, after a predetermined number of rings, a message subroutine is executed by CPU 16. However, the present invention is not limited to voice mail operations performed by the CPU 16 and therefore, voice mail systems such as Lucent Technologies' Audix™ voice mail messaging system may be employed in conjunction with the integral computer and telephone system 10. After the message subroutine has been executed as shown in functional block 76 or if the user decides to discontinue the call, the call is terminated or ended as shown by functional block 78.

After the telephone subroutines are initiated in functional block 68, CPU 16 determines whether or not the user has taken or initiated the call with the CPU 16 as outlined in predicate node 80. If the user does not take the call or with the PC or CPU 16, the message subroutine is activated as outlined in functional block 76. If the user does take the call with the PC or CPU 16, CPU 16 in step 82 continuously monitors whether or not the switching device 32 on the base unit 12 or switching device 58 on the remote unit 14 has been activated. If the user decides to take a call with the remote unit, either switching device 32 or 58 is activated and then the CPU 16 activates the remote unit as outlined in functional block 66. If the user decides not to activate the switching device 32 on the base unit 12 or switching unit 58 on the remote unit 14, the user can continue with a call or terminate the call as outlined in functional block 84.

As part of the message subroutine activated in functional block 76, the CPU 16 can activate an indicator 30 on the base unit that displays a status of voice mail messages. As mentioned previously, the indicators 30 can take the form of either LCDs or LEDs which tell the user how many voice mail messages are present on either the CPU 16 or on the voice mail message system. Separate from the incoming call and outgoing call processes, the CPU 16 may also initiate subroutines which activate the indicators 30 on the base unit 12 which indicates the presence or number of E-mail messages that are detected by CPU 16. The CPU 16 may also forward the status of both voice mail messages and E-mail messages to the remote unit 14 which includes indicators/displays 48 that can provide information on the remote unit 14 so that a user will know the status of E-Mail and/or voice mail messages.

Figure 4:
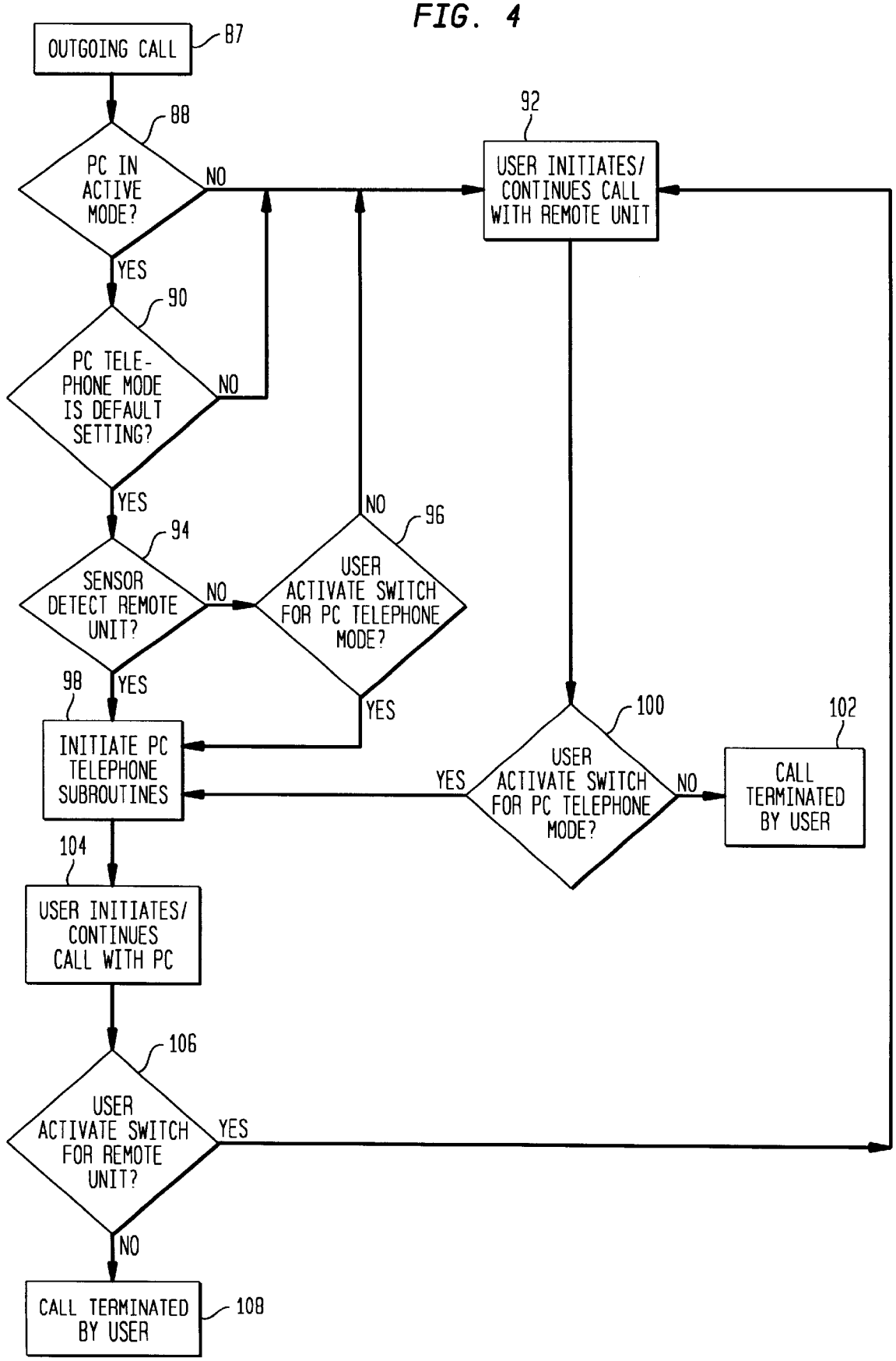
FIG. 4 illustrates a functional block diagram of processing an outgoing call with an integral telephone and computer system.

FIG. 4 illustrates an outgoing call process 87 with an integral computer and telephone system 10 of the present invention. This outgoing call process can also be executed by a computer system having a program modeled after this outgoing call process described in detail below.

CPU 16 determines whether or not the CPU 16 is in an active or inactive mode as shown in predicate node 88. If CPU 16 detects that the computer system is in an active mode, then the process proceeds predicate node 90 where CPU 16 determines whether or not the CPU 16 is in the default setting for handling a call. If in either predicate nodes 88 or 90 where the CPU 16 is not in an active mode or if the CPU 16 is not the default setting for handling calls, then the user can initiate or continue a call with the remote unit 14 as outlined by functional block 92.

After predicate node 90, if CPU 16 determines that the default setting is for computer based communication, then CPU 16 determines if the remote unit 14 is adjacent to base unit 12 by monitoring signals from the remote unit sensor 34. If in predicate node 94, the CPU determines that the remote unit is not adjacent to the base unit 12, then the CPU 16 then determines whether the switching device 32 on the base unit 12 or switching device 58 on the remote unit 14 has been activated. If either switching device 32 or 58 has been activated for remote unit 14 operation, then the CPU 16 activates the remote unit 14 and continues with the function as shown in functional block 92. If in either predicate nodes 94 or 96 where the CPU unit 16 detects the remote unit 14 adjacent to the base unit 12 or if the CPU 16 detects that the user has activated either switching device 32 or 58 for computer based communication, the CPU 16 proceeds to functional block 98 where the PC initiates telephone subroutines which activate the audio input and output devices 28 of the base unit 12.

After the user initiates or continues a call with the remote unit 14 as outlined in functional block 92, the CPU 16 continuously monitors the status of the switching device 58 on the remote unit 14 and switching device 32 on the base unit 12. If the user activates either switch 58 on the remote unit or switch 32 on the base unit 12 for computer communication, CPU 16 initiates telephone subroutines as outlined by functional block 98. As shown in functional block 102, the user can terminate a call while in remote unit operation.

After functional block 98, the user initiates or continues a call with the CPU 16 as shown in functional block 104. During computer based communication, the CPU 16 continuously monitors switching devices 32 and 58 of the base unit 12 and remote unit 14 to determine if the user desires to have the call forwarded to the remote unit 14 for remote unit operation as outlined in predicate node 106. During computer communication, a user can terminate a call while in this mode of operation as outlined by functional block 108.

What is claimed is:

1. A method of handling seamless shifting of telephony between a computer and a remote unit, the method comprising the steps of:
   receiving a first telephone call at a computer;
   detecting whether the computer is in an active or an inactive mode, if the computer is in the active mode, then initiating subroutines in the computer, said subroutines controlling a microphone and audio output device which are operatively linked to the computer, such that the microphone and the audio output device can accomplish computer telephony with the first telephone call if activated by a user, if the computer is in the inactive mode, then activating a communications module which transceives wireless signals to and from a remote unit, such that the remote unit can accomplish remote unit telephony with the first telephone call if activated by a user; and
   shifting between computer telephony and remote unit telephony during a session of the first telephone call upon a user's actuation of a switch, whereby upon actuation of the switch, the first telephony session is seamlessly switched from one of the computer and the remote unit to the other of the computer and the remote unit, and when a user selects remote unit telephony, said remote unit substantially increases privacy and facilitates portability via wireless operation, and when the user selects computer telephony, said computer facilitates both audio and visual information exchange.

2. The method of claim 1, further comprising the steps of:
   detecting whether the computer is a default setting which includes answering or generating telephony; and
   detecting a presence of the remote unit at a predetermined location.

3. The method of claim 2, wherein the step of detecting a presence of the remote unit further includes monitoring input and output of contacts of a charging unit adapted to receive the remote unit and if the remote unit is not operatively linked to the charging unit, then activating the communications module for transceiving wireless signals to and from a remote unit.

4. The method of claim 2, wherein the step of detecting a presence of the remote unit further includes monitoring a sensor device and if the sensor generates a predetermined signal, then activating the communications module for transceiving wireless signals to and from a remote unit.

5. The method of claim 3, wherein the step of activating a communications module includes generating radio frequency signals, the radio frequency signals operatively linking the remote unit to the computer.

6. The method of claim 4, wherein the step of activating the communications module includes generating radio frequency signals, the radio frequency signals operatively linking the remote unit to the computer.

7. The method of claim 1, further comprising the step of:
   operatively linking the computer to a telephone line.

8. The method of claim 7, wherein the step of operatively linking the computer to a telephone line includes connecting the telephone line to a modem device of the computer.

9. The method of claim 1, further comprising the step of:
   initiating a message subroutine if a user does not interact with either the computer or the remote unit.

10. The method of claim 1, further comprising the step of:
    providing an integral housing which includes the computer and a charging device for the remote unit.

11. The method of claim 1, further comprising the step of:
    activating an indicator on the remote unit, said indicator providing message information to a user.

12. The method of claim 1, further comprising the step of:
    activating an indicator operatively linked to the computer, said indicator providing at least one of message information and status information of the switch.

13. A system for enabling seamless telephony transfer between a computer and a remote unit, the system comprising:
    a computer including:
      a CPU;
      a telephone interface operatively linked to said CPU;
      a display device operatively linked to said CPU;
      an audio input device operatively linked to said CPU;
      an audio output device operatively linked to said CPU;
      a first communication module for transceiving wireless signals operatively linked to said CPU;
    a remote unit including a second communication module, said second communication module for transceiving wireless signals with said first communication module; and a switching device physically connected to one of said computer and said remote unit, said switching device providing selective shifting of telephony between said computer and said remote unit, wherein user actuation of said switching device causes seamless switching of a continuous telephony session from one of said computer and said remote unit to the other of said computer and said remote unit.

14. The system of claim 13, further comprising a housing, said housing containing said CPU, said first communication module, and said switching device.

15. The system of claim 13, wherein said first communication module includes a first radio frequency transceiver, said second communication module of said remote unit includes a second radio frequency transceiver which is operatively linked to said first radio frequency transceiver.

16. The system of claim 13, wherein said communication module includes a first radio frequency transceiver, said remote unit includes a second radio frequency transceiver which is operatively linked to said first radio frequency transceiver.

17. The system of claim 13, further comprising a sensor, said sensor detecting a presence of said remote unit relative to said CPU.

18. The system of claim 13, wherein said telephone interface includes a modem operatively linked to said CPU.

19. The system of claim 13, further comprising a first indicator operatively linked with said CPU, and a second indicator operatively linked to said remote unit, said first indicator providing mode operation information to a user while said second indicator providing message waiting information to the user.

20. The system of claim 13, wherein said switching device is a mechanically actuated switch.

21. The system of claim 13, wherein said switching device is a first switching device physically connected to said computer, and further comprising:

a second switching device physically connected to said remote unit, wherein user actuation of either of said first or second switching devices causes seamless switching of a continuous telephony session from one of said computer and said remote unit to the other of said computer and said remote unit.

* * * * *